US012677337B2

(12) United States Patent
Dong

(10) Patent No.: US 12,677,337 B2
(45) Date of Patent: Jul. 7, 2026

(54) METHODS AND APPARATUSES FOR MULTI-LINK COMMUNICATION

(71) Applicant: Beijing Xiaomi Mobile Software Co., Ltd., Beijing (CN)

(72) Inventor: Xiandong Dong, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 330 days.

(21) Appl. No.: 18/555,644

(22) PCT Filed: Apr. 16, 2021

(86) PCT No.: PCT/CN2021/087804
§ 371 (c)(1),
(2) Date: Oct. 16, 2023

(87) PCT Pub. No.: WO2022/217586
PCT Pub. Date: Oct. 20, 2022

(65) Prior Publication Data
US 2024/0205997 A1 Jun. 20, 2024

(51) Int. Cl.
*H04W 76/15* (2018.01)
*H04W 76/11* (2018.01)
(52) U.S. Cl.
CPC ............ *H04W 76/15* (2018.02); *H04W 76/11* (2018.02)
(58) Field of Classification Search
CPC ...... H04W 76/15; H04W 76/11; H04W 72/04
See application file for complete search history.

(56) References Cited

U.S. PATENT DOCUMENTS

| | | | |
|---|---|---|---|
| 2010/0329195 A1 | 12/2010 | Abraham et al. | |
| 2011/0188598 A1 | 8/2011 | Lee et al. | |
| 2013/0329680 A1 | 12/2013 | Lee et al. | |
| 2015/0036674 A1 | 2/2015 | Lee et al. | |
| 2016/0278081 A1 | 9/2016 | Chun et al. | |
| 2016/0330732 A1* | 11/2016 | Moon .................. | H04B 7/0639 |

(Continued)

FOREIGN PATENT DOCUMENTS

| | | |
|---|---|---|
| CN | 102781097 A | 11/2012 |
| CN | 102783048 A | 11/2012 |

(Continued)

OTHER PUBLICATIONS

State Intellectual Property Office of the People's Republic of China, Office Action and Search Report Issued in Application No. 2021800010641, Jun. 27, 2025, 10 pages.(Submitted with Machine/Partial Translation).

(Continued)

*Primary Examiner* — Sudesh M. Patidar
(74) *Attorney, Agent, or Firm* — Volpe Koenig

(57) ABSTRACT
A method for multi-link communication includes: determining a first message frame, wherein the first message frame includes first identifier information configured to identify spatial streams used for a transmitting operation, and second identifier information configured to identify spatial streams used for a receiving operation, and the transmitting operation and the receiving operation are performed simultaneously in at least one pair of links supporting simultaneous transmitting and receiving functionality; and transmitting the first message frame.

15 Claims, 2 Drawing Sheets

AP MLD non-AP STA MLD

10

20

AP1 ⟵ Link 1 ⟶ STA1

AP2 ⟵ Link 2 ⟶ STA2

AP3 ⟵ Link 3 ⟶ STA3

AP4 ⟵ Link 4 ⟶ STA4

(56) References Cited

U.S. PATENT DOCUMENTS

| | | | | |
|---|---|---|---|---|
| 2016/0359653 A1* | 12/2016 | Lee | ..................... | H04W 74/085 |
| 2020/0187186 A1 | 6/2020 | Li et al. | | |
| 2020/0228938 A1 | 7/2020 | Lee et al. | | |
| 2020/0274686 A1* | 8/2020 | Khude | .............. | H04W 74/0816 |
| 2021/0014776 A1 | 1/2021 | Patil et al. | | |
| 2021/0014911 A1 | 1/2021 | Patil et al. | | |
| 2021/0204267 A1* | 7/2021 | Li | ......................... | H04W 16/28 |
| 2023/0042842 A1* | 2/2023 | Yu | ......................... | H04L 5/0098 |
| 2023/0103325 A1* | 4/2023 | Li | ..................... | H04W 28/0875 |
| 2023/0164859 A1* | 5/2023 | Jang | ...................... | H04W 76/11 |
| | | | | 370/328 |

FOREIGN PATENT DOCUMENTS

| | | |
|---|---|---|
| CN | 105794296 A | 7/2016 |
| CN | 109413672 A | 3/2019 |
| CN | 110890907 A | 3/2020 |
| WO | WO-2010110619 A2 * | 9/2010 ............ H04W 74/04 |
| WO | 2019017590 A1 | 1/2019 |
| WO | 2020032641 A1 | 2/2020 |

OTHER PUBLICATIONS

Qualcomm Incorporated, "HARQ retransmission operation for UL MIMO", R1-122858, 3GPP TSG RAN WG1 Meeting #69, Prague, Czech Republic, May 21-26, 2012, 3 pages.

ISA State Intellectual Property Office of the People's Republic of China, Written Opinion of the International Searching Authority Issued in Application No. PCT/CN2021/087804, Jan. 13, 2022, WIPO, 7 pages.

ISA State Intellectual Property Office of the People's Republic of China, International Search Report Issued in Application No. PCT/CN2021/087804, Jan. 13, 2022, WIPO, 4 pages.

Ericsson. "Simultaneous Rx/Tx support for dual connectivity", 3GPP TSG RAN WGI Meeting #76bis R1-141648, Apr. 4, 2014, 2 pages.

* cited by examiner

METHODS AND APPARATUSES FOR MULTI-LINK COMMUNICATION

CROSS REFERENCE TO RELATED APPLICATIONS

This application is a National Phase of International Application No. PCT/CN2021/087804, filed on Apr. 16, 2021, the entire contents of which are incorporated herein by reference in their entireties.

TECHNICAL FIELD

The present disclosure relates to the field of wireless communication technologies, and in particular to methods for multi-link communication and apparatuses for multi-link communication.

BACKGROUND

The current research scope of Wi Fi technology is: 320 MHz bandwidth transmission, aggregation and collaboration of multiple frequency bands, etc. It is expected to improve the rate and throughput by at least four times compared to existing standards. Its main application scenarios are video transmission, augmented reality (AR), virtual reality (VR), etc.

Aggregation and collaboration of multiple frequency bands refers to communication between devices simultaneously in frequency bands such as 2.4 GHz, 5 GHZ, and 6 GHz. For communication between devices simultaneously in multiple frequency bands, a new media access control (MAC) mechanism needs to be defined for management. In addition, it is expected that the aggregation and collaboration of multiple frequency bands can support low-latency transmission.

Currently, the maximum bandwidth supported in multi-band aggregation and system technology is 320 MHz (160 MHz+160 MHz), and it may also support 240 MHz (160 MHz+80 MHz) and other bandwidths.

In the present technology, a station (STA) and an access point (AP) may be a multi-link device (MLD), which supports the ability to send and/or receive simultaneously in multiple links at the same time. Therefore, in current technology, there can be multiple links between the STA and the AP, and the communication between these two devices in multiple links is researched.

SUMMARY

Embodiments of the present disclosure provide the following technical solutions.

According to an embodiment of the present disclosure, there is provided a method for multi-link communication, including: determining a first message frame, where the first message frame includes first identifier information configured to identify spatial streams used for a transmitting operation, and second identifier information configured to identify spatial streams used for a receiving operation, and the transmitting operation and the receiving operation are performed simultaneously in at least one pair of links supporting simultaneous transmitting and receiving functionality; and transmitting the first message frame.

According to an embodiment of the present disclosure, there is provided a method for multi-link communication, including: receiving a first message frame, where the first message frame includes first identifier information configured to identify spatial streams used for a transmitting operation, and second identifier information configured to identify spatial streams used for a receiving operation, and the transmitting operation and the receiving operation are performed simultaneously in at least one pair of links supporting simultaneous transmitting and receiving functionality; and performing a communication operation based on the first message frame.

According to an embodiment of the present disclosure, there is provided an electronic device, including: a processor; and a memory storing computer programs executable by the processor, where the processor is configured to, when executing the computer programs, perform the above-mentioned methods.

According to an embodiment of the present disclosure, there is provided a non-transitory computer-readable storage medium, storing computer programs thereon, where the computer programs, when executed by a processor, cause the processor to perform the above-mentioned methods.

BRIEF DESCRIPTION OF THE DRAWINGS

By referring to the accompanying drawings and describing in detail the exemplary embodiments disclosed herein, the above and other features of the embodiments of the present disclosure will become more obvious.

DETAILED DESCRIPTION OF THE EMBODIMENTS

The following description, with reference to the accompanying drawings, is provided to aid in a full understanding of various embodiments of the present disclosure as defined by the appended claims and their equivalents. The various embodiments of the present disclosure include various specific details, but these specific details are considered exemplary only. In addition, for clarity and conciseness, descriptions of well-known technologies, functions, and constructions can be omitted.

Terms and phrases used in the present disclosure are not limited to their written meaning, but are used only by the inventors to enable a clear and consistent understanding of the disclosure. Accordingly, for those skilled in the art, the description of various embodiments of the present disclosure is provided for purposes of illustration only and not for purposes of limitation.

It will be understood that the singular forms "a", "an", and "the" are intended to include the plural forms as well, unless the context clearly indicates otherwise. It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof.

It will be understood that while the terms "first", "second", etc., may be used herein to describe various elements, these elements should not be limited by these terms. These terms are only used to distinguish one element from another. Thus, without departing from the teachings of the example embodiments, the first element discussed below may be referred to as a second element.

It will be understood that when an element is referred to as "connected" or "coupled" to another element, it may be directly connected or coupled to another element, or there may be intermediate elements. In addition, "connected" or "coupled" as used herein may include wireless connection or wireless coupling. The terms "and/or" or the expression "at least one of . . . " as used herein include any and all combinations of one or more of the items listed therein.

Unless otherwise defined, all terms used herein, including technical or scientific terms, have the same meanings as those generally understood by those with ordinary knowledge in the field of art to which the present disclosure belongs.

Figure 1:
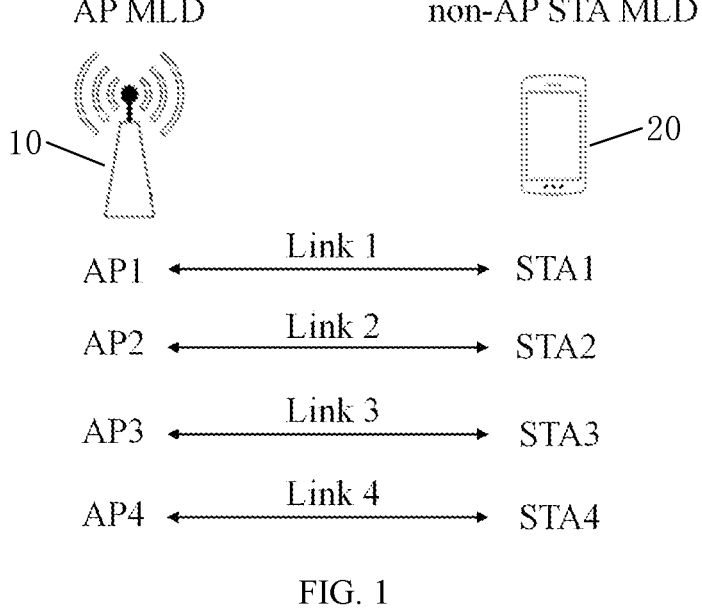
FIG. 1 is an exemplary diagram illustrating a multi-link communication scenario.

FIG. 1 is an exemplary diagram illustrating a multi-link communication scenario.

In a wireless local area network (LAN), a basic service set (BSS) may include an access point (AP) 10 and one or more stations (STAs) 20 in communication with the AP. A BSS can be connected to a distribution system (DS) through its APs and then to another BSS to form an extended service set (ESS).

An AP is a wireless switch used in a wireless network and is also a core of the wireless network. The AP device can be used as a wireless base station, mainly as a bridge to connect wireless and wired networks. By the AP, the wired and wireless networks can be integrated.

The AP may include software applications and/or circuitry to allow other types of nodes in the wireless network to communicate with the outside of the wireless network as well as the inside of the wireless network via the AP. In some examples, for example, an AP can be a terminal device or a network device equipped with a wireless fidelity (Wi-Fi) chip.

As an example, a station (STA) may include, but is not limited to: a cellular phone, a smart phone, a wearable device, a computer, a personal digital assistant (PDA), a personal communication system (PCS) device, a personal information manager (PIM), a personal navigation device (PND), a global positioning system (GPS), a multimedia device, an internet of thing (IoT) device, and the like.

In the embodiments of the present disclosure, the AP and the STA may support a multi-link device (MLD), for example, and may be denoted as an access point multi-link device (AP MLD) and a non-access point station multi-link device (non-AP STA MLD), respectively. For the convenience of description, in the following, an example of multi-link communication between an AP and a STA will be mainly described. However, embodiments of the present disclosure are not limited thereto. The multi-link communication between other number of AP MLDs and non-AP STA MLDs is also included within the scope of the present disclosure.

In FIG. 1, as an example only, the AP MLD can represent an access point that supports a multi-link communication function, and the non-AP STA MLD can represent a station that supports a multi-link communication function. Referring to FIG. 1, the AP MLD can include affiliated APs working in four links, such as an AP1, an AP2, an AP3 and an AP4 shown in FIG. 1. The non-AP STA MLD can also include affiliated STAs working in four links, such as a STA1, a STA2, a STA3 and a STA4 shown in FIG. 1. In the example in FIG. 1, for example, the AP1 communicates with the STA1 through a corresponding first link (link 1). Similarly, the AP2, the AP3, and the AP4 communicate with the STA2, the STA3, and the STA4 through a second link (link 2), a third link (link 3), and a fourth link (link 4), respectively. In addition, the link 1 to the link 4 can be multiple links at different frequencies, such as links at 2.4 GHz, 5 GHZ, 6 GHZ, or several links with the same or different bandwidths at 2.4 GHz, 5 GHZ, 6 GHz. In addition, there can be multiple channels can in each link. However, it will be understood that the communication scenario shown in FIG. 1 is only exemplary, and the present disclosure is not limited thereto. For example, the AP MLD can be linked to multiple non-AP STA MLDs, or in each link, an AP can communicate with multiple other types of STAs.

In a simultaneous transmit and receive (STR) mechanism, a non-AP STA MLD may operate in enhanced multi-link multi-radio (EMLMR) mode under a specified set of enabled links between the non-AP STA MLD and an AP MLD associated with the non-AP STA MLD. The EMLMR mode can mean that the non-AP STA MLD is communicating with the AP MLD in multiple links at a certain time while listening to the channel in multiple links. A specified set of enabled links in EMLMR mode can be referred to as EMLMR links. When the non-AP STA MLD operates in EMLMR mode, the spatial stream capability and the operation mode of each link may be exchanged via an initial frame in one of the EMLMR links. However, in the related art, when performing receiving and transmitting operations, which spatial streams are not specifically limited (e.g., the numbers of spatial streams are not identified), then in EMLMR mode, a number of spatial streams (NSS) used for the receiving and transmitting operations between the non-AP MLD and the AP MLD will be as large (such as maximum) as possible (such as maximum), which tends to result in the reuse of certain spatial streams, and bring about conflicts.

In accordance with the conception of the present disclosure, the following communication methods and communication apparatuses are provided to address at least the above problems and/or drawbacks and to better utilize the STR mechanism.

Figure 2:
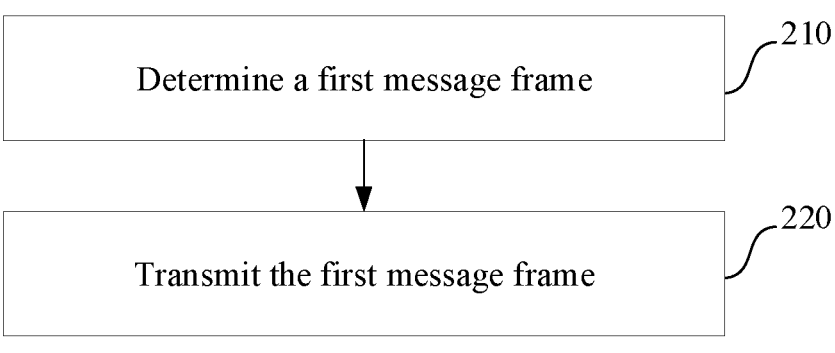
FIG. 2 is a flowchart illustrating a method for multi-link communication according to an embodiment of the present disclosure.

FIG. 2 is a flowchart illustrating a method for multi-link communication according to an embodiment of the present disclosure. The method shown in FIG. 2 may be an operation performed by a transmitter. According to the embodiments, the transmitter may be an access point or a station supporting multi-link communication.

Referring to FIG. 2, at step 210, a first message frame is determined. According to the embodiments, the first message frame includes first identifier information configured to identify spatial streams used for a transmitting operation, and second identifier information configured to identify spatial streams used for a receiving operation, and the transmitting operation and the receiving operation are performed simultaneously in at least one pair of links supporting simultaneous transmitting and receiving functionality.

In the embodiments of the present disclosure, there may be various ways of determining the first message frame, e.g., the first message frame may be generated based on at least one of the following: a network condition, a load condition, a hardware capability of the transmitting/receiving device, a service type, or a relevant protocol stipulation, the embodiments of the present disclosure are not limited thereto. In the embodiments of the present disclosure, the first message frame may also be obtained from an external device, and the embodiments of the present disclosure are not limited thereto. For example, according to the embodiments of the present disclosure, the first message frame may be determined based on an actual amount of data (e.g., an amount of data in the transmitting operation and an amount of data in the receiving operation), and specifically, the spatial streams for the transmitting operation and the spatial streams for the receiving operation may be determined based on the actual amount of data. In other words, the transmitter and the receiver may coordinate the NSS based on the actual amount of data to improve spectrum utilization. This will be described in detail later.

At step 220, the first message frame is transmitted. That is, the transmitter informs the receiving end of the utilization of the spatial streams by carrying information about the spatial streams for the transmitting operation and the spatial streams for the receiving operation in the first message frame.

According to the embodiments of the present disclosure, the first message frame may be an initial frame defined before the STR communication is performed, with identifying the start of the STR communication, and the initial frame may be initiated by the AP or may be initiated by the STA, e.g., may be performed in a link of the STR links (e.g., a link of the STR links determines and transmits the first message frame). For example, the STR links may be a pair of links that support simultaneous transmit and receive functionality. Furthermore, the first message frame (i.e., the initial frame) may be any type of frame (e.g., any form of data frame, management frame, and control frame), for example, may be a MU-RTS frame or a buffer status report poll (BSRP) frame, and the present disclosure is not specifically limited to thereto.

The communication method shown in FIG. 2 may be performed in one or more pairs of STR links, which will be described in detail below with reference to Tables 1 and 2, respectively.

When the STR communication is performed in a pair of STR links, the first message frame may include spatial stream information (first identifier information) of a link used for the transmitting operation in the pair of STR links and spatial stream information (second identifier information) of a link used for the receiving operation in the pair of STR links. For example, the format of the first message frame (i.e., the initial frame) may have a format as shown in Table 1 below.

TABLE 1

| the format of the first message frame | | | |
|---|---|---|---|
| . . . Tx SS | | Rx SS | . . . |
| The spatial streams corresponding to the transmitting operation | | The spatial streams corresponding to the receiving operation | |

Referring to Table 1, the first message frame (i.e., the initial frame) may include: the spatial streams corresponding to the transmitting operation (Tx SS shown in Table 1) (specifically, which spatial streams may be used for data transmitting), and the spatial streams corresponding to the receiving operation (Rx SS shown in Table 1) (specifically, which spatial streams may be used for data receiving). In Table 1, the Tx SS may correspond to the first identifier information for identifying the spatial streams used for the transmitting operation, and the Rx SS may correspond to the second identifier information for identifying the spatial streams used for the receiving operation. In addition, although not shown in Table 1, the first message frame may be more other contents.

According to embodiments of the present disclosure, each of the Tx SS (the first identifier information) as well as the Rx SS (the second identifier information) may be identified by a plurality of bytes.

In an embodiment of the present disclosure, the first identifier information and the second identifier information each may include a bitmap corresponding to all supported spatial streams. For example, in the case where the transmitter and the receiver are capable of supporting a maximum of 16 spatial streams, the bitmap of all of the spatial streams may be identified by 16 bits (2 bytes), i.e., all supported spatial streams may be identified by 16 bits (2 bytes). Specifically, spatial streams used for the transmitting operation in all of the spatial streams can be identified by 2 bytes (i.e., the Tx SS in Table 1 has 2 bytes), and spatial streams used for the receiving operation in all of the spatial streams can be identified by 2 bytes (i.e., the Rx SS in Table 1 has 2 bytes). For example, for the Tx SS, each of the 16 bits included in the 2 bytes may correspond to one of the 16 spatial streams, and a spatial stream corresponding to the corresponding bit for the transmitting operation can be identified by setting the corresponding bit to the first value (such as "1") in the first message frame. The 2 bytes in the Rx SS can be set similarly, and the repetitive description is omitted herein for brevity. The first identifier information and the second identifier information are represented through a bit-bitmap, such that the transmitter and the receiver can codify and decode the information related to the used spatial stream in a concise method.

In another embodiment of the present disclosure, the first identifier information and the second identifier information may identify the spatial streams used for the transmitting operation and the spatial streams used for the receiving operation, respectively, by two parts of bits, where a first part in the two parts of bits identifies a starting spatial stream for the transmitting operation or a starting spatial stream for the receiving operation, and a second part in the two parts of bits identifies a number of the spatial streams used for the transmitting operation or a number of the spatial streams used for the receiving operation. For example, when the transmitter and the receiver are capable of supporting a maximum of 16 spatial streams, each of the Tx SS and the Rx SS in Table 1 may have 2 bytes, where the first part (e.g., 4 bits in the high byte) can represent the starting spatial stream used for the Tx (transmitter) or the Rx (receiver), and the second part (e.g., 4 bits in the low byte) can represent the number of spatial streams used for the Tx or the Rx. The Tx SS is described as an example, the Tx SS can be set to 10000101, the first part (the high four bits "1000") can identify the starting spatial stream as the eighth spatial stream in the 16 spatial streams, and the second part (the low four bits "0101") may identify the number of spatial streams used for the transmitting operation as 5, such that the eighth to twelfth spatial streams after all 16 spatial streams may be identified as being available for the transmitting operation. The Rx SS may be identified similarly, and the repetitive description is omitted herein for brevity. By representing the first identifier information and the second identifier information through two parts of bits, it may not be necessary for each spatial stream to occupy a single bit, and thus it may be possible to identify information related to a larger number of spatial streams with fewer bits, when a number of supported spatial streams is larger.

According to the embodiments of the present disclosure, the spatial streams used for the transmitting operation identified by the first identifier information do not overlap with the spatial streams used for the receiving operation identified by the second identifier information. That is, for example, the spatial streams corresponding to the transmitting operation and the spatial streams corresponding to the receiving operation identified by the above two embodiments are non-overlapping with each other, so that reuse of the spatial streams can be avoided, thereby the conflict is avoided.

Although the above embodiments are described in terms of a total of 16 spatial streams as well as 2 bytes (16 bits), it will be understood that these numbers are only illustrative examples and are not a limitation of the present disclosure, and that the Tx SS (the first identifier information) and the Rx SS (the second identifier information) in Table 1 may be of different sizes according to the supported spatial streams.

When the STR communication is performed in multiple pairs of STR links, that is, the transmitting operation and the receiving operation may be performed simultaneously in at least two pairs of links that support simultaneous transmitting and receiving functionality. In this case, the first message frame may also include: a link identifier for each of the at least two pairs of links. For example, the format of the first message frame may be as shown in Table 2 below.

TABLE 2

| The format of the first message frame | | | | | | | |
|---|---|---|---|---|---|---|---|
| ... | STR link pair 1 | STR link pair 2 | ... | Tx SS 1 | Rx SS 1 | Tx SS 2 | Rx SS 2 | ... |

Referring to Table 2, a STR link pair 1, a STR link pair 2, etc., may be link identifiers for each pair, respectively. For example, each of the STR link pair 1 and the STR link pair 2 may include a link identifier (link ID) for a link used for the transmitting operation and a link identifier for a link used for the receiving operation in the pair of STR links. Alternatively, the link identifiers configured to identify each of the STR link pair 1 and the STR link pair 2 may have the form of link set identifiers. For example, when n links are established between a transmitter and the receiver for communication, each of the STR link pair 1 and the STR link pair 2 may have n bits (each bit corresponding to one of the n links), and when the corresponding two bits in each of the STR link pair 1 and the STR link pair 2 are set to a first specific value (e.g., "1"), the two links corresponding to the two bits are identified as a pair of STR links.

With continued reference to Table 2, the first message frame may include a plurality of pieces of first identifier information (e.g., Tx SS 1, Tx SS 2, etc.) and a plurality of pieces of second identifier information (e.g., Rx SS 1, Rx SS 2, etc.). The link identifier for each of the at least two pairs of links is mapped to a corresponding first identifier information and a corresponding second identifier information in the mapping of the plurality of pieces of the first identifier information and the plurality of pieces of the second identifier information. For example, the STR link pair 1 may be mapped to the first identifier information (Tx SS 1) and the second identifier information (Rx SS 1), and the STR link pair 2 may be mapped to the first identifier information (Tx SS 2) and the second identifier information (Rx SS 2). Each of the plurality of pieces of the first identifier information and each of the plurality of pieces of the second identifier information are mapped to a corresponding link, such that a plurality of pairs of STR links perform communication operations simultaneously to improve spectrum utilization. Each of the plurality of pieces of first identifier information and each of the plurality of pieces of second identifier information may identify the spatial streams in the bitmap or the two parts of bits with reference to the embodiments described in Table 1, and repetitive descriptions are omitted herein for brevity.

According to the embodiments of the present disclosure, a number of spatial streams identified by each of the plurality of pieces of the first identifier information and a number of spatial streams identified by each of the plurality of pieces of the second identifier information are both less than a maximum number of spatial streams.

According to the embodiments of the present disclosure, a sum of a number of spatial streams identified by the plurality of pieces of the first identifier information and a number of spatial streams identified by the plurality of pieces of the second identifier information is less than a maximum number of spatial streams.

The maximum number of spatial streams may be pre-negotiated by the transmitter and the receiver, or determined according to a standard, e.g., in an extreme high-throughput (EHT) communication environment, the maximum number of spatial streams may be, but not limited to, 16, for example.

Described in conjunction with FIG. 1, for example, the Link 1 and the Link 2 may be a first STR link pair, the number of spatial streams mapped to the Link 1 is N1, and the number of spatial streams mapped to the Link 2 is N2. The Link 3 and the Link 4 may be a second STR link pair, the number of spatial streams mapped to the Link 3 is N3, and the number of spatial streams mapped to the Link 4 is N4. The maximum number of spatial streams is N, each of N1, N2, N3, and N4 may be less than N, and furthermore, the sum of N1, N2, N3 and N4 may be less than N. This avoids reuse of spatial streams, and thus avoids conflicts. It will be understood that the description herein is only exemplary, for example, the Link 1 and the Link 2 may be a first STR link pair, the Link 1 and the Link 3 may be a second STR link pair, and the Link 3 and the Link 4 may be a third STR link pair, in this case, the spatial streams mapped by each pair of link identifiers need to be non-overlapping and the mapped spatial streams need to meet the limit of the maximum number of spatial streams mentioned above.

According to the embodiments of the present disclosure, in the case of a STR link pair, since the non-AP STA MLD and the AP MLD can identify the STR link pair during the establishment of multiple links, there is no need to indicate the mapping between the link identifier and the spatial stream, as shown in Table 1, the link identifier of the STR link pair is not included.

According to the embodiments of the present disclosure, in the case of a plurality of STR link pairs, it is necessary to add the mapping between the link identifier and the spatial stream to Table 1, as shown in Table 2. The Link identifier is a combination of information about the operating spectrum, bandwidth/channel, and base service set identifier (BSSID).

According to the embodiments of the present disclosure, the maximum number of NSS for all mappings, subject to the baseline formed in the EHT communication environment, cannot exceed the maximum NSS for Rx/Tx at the MLD level.

Figure 3:
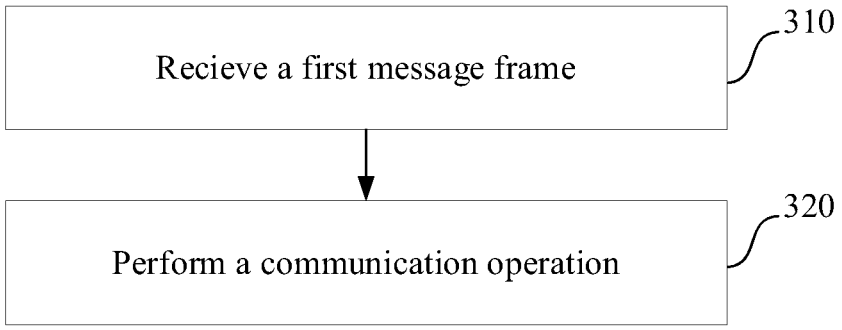
FIG. 3 is a flowchart illustrating a method for multi-link communication according to another embodiment of the present disclosure.

FIG. 3 is a flowchart illustrating a method for multi-link communication according to another embodiment of the present disclosure. The method shown in FIG. 3 may be applied to a receiver supporting multi-link communication.

For example, in the case where the method shown in FIG. 2 is applied to an AP MLD as a transmitter, and the method shown in FIG. 3 may be applied to a non-AP STA MLD; and in the case where the method shown in FIG. 2 is applied to a non-AP STA MLD as a transmitter, and the method shown in FIG. 3 may be applied to an AP MLD.

Referring to FIG. 3, at step 310, a first message frame is received, where the first message frame includes first identifier information configured to identify spatial streams used for a transmitting operation, and second identifier information configured to identify spatial streams used for a receiving operation, and the transmitting operation and the receiving operation are performed simultaneously in at least one pair of links supporting simultaneous transmitting and receiving functionality.

According to the embodiments of the present disclosure, the spatial streams used for the transmitting operation identified by the first identifier information do not overlap with the spatial streams used for the receiving operation identified by the second identifier information.

According to the embodiments of the present disclosure, the first identifier information and the second identifier information each include a bitmap corresponding to all supported spatial streams.

According to the embodiments of the present disclosure, the first identifier information and the second identifier information identify the spatial streams used for the transmitting operation and the spatial streams used for the receiving operation, respectively, by two parts of bits, where a first part in the two parts of bits identifies a starting spatial stream for the transmitting operation or a starting spatial stream for the receiving operation, and a second part in the two parts of bits identifies a number of the spatial streams used for the transmitting operation or a number of the spatial streams used for the receiving operation.

According to the embodiments of the present disclosure, the at least one pair of links includes at least two pairs of links, where the first message frame further includes a link identifier for each of the at least two pairs of links.

According to the embodiments of the present disclosure, the first message frame includes a plurality of pieces of the first identifier information and a plurality of pieces of the second identifier information, where the link identifier for each of the at least two pairs of links is mapped to a corresponding first identifier information and a corresponding second identifier information in mapping of the plurality of pieces of the first identifier information and the plurality of pieces of the second identifier information.

According to the embodiments of the present disclosure, a number of spatial streams identified by each of the plurality of pieces of the first identifier information and a number of spatial streams identified by each of the plurality of pieces of the second identifier information are both less than a maximum number of spatial streams.

According to the embodiments of the present disclosure, a sum of a number of spatial streams identified by the plurality of pieces of the first identifier information and a number of spatial streams identified by the plurality of pieces of the second identifier information is less than a maximum number of spatial streams.

The first message frame, the (plurality of pieces of) first identifier information, and the (plurality of pieces of) second identifier information, the link identifiers, and the like depicted in FIG. 3 may be analogous to embodiments described with reference to FIG. 2 as well as Tables 1 and 2, and repetitive descriptions are omitted herein for brevity.

With continued reference to FIG. 3, at step 320, a communication operation is performed based on the first message frame. For example, simultaneous transmitting and receiving of data over corresponding spatial streams in corresponding links may be performed by using the spatial streams for identifying the transmitting operation, the spatial streams for identifying the receiving operation, and/or the link identifiers in the first message frame.

Figure 4:
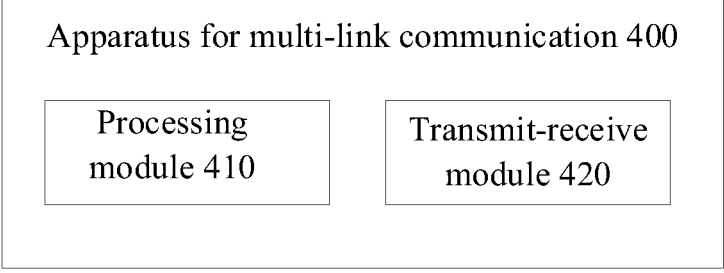
FIG. 4 is a block diagram illustrating an apparatus for multi-link communication according to an embodiment of the present disclosure.

FIG. 4 is a block diagram illustrating an apparatus for multi-link communication according to an embodiment of the present disclosure.

Referring to FIG. 4, the apparatus 400 for multi-link communication may include a processing module 410 and a transmit-receive module 420. The apparatus 400 shown in FIG. 4 may be applied to a transmitter device and a receiver device that support multi-link communication.

In the case where the apparatus 400 shown in FIG. 4 is applied to the transmitter device, the processing module 410 may be configured to determine a first message frame, where the first message frame includes first identifier information configured to identify spatial streams used for a transmitting operation, and second identifier information configured to identify spatial streams used for a receiving operation, and the transmitting operation and the receiving operation are performed simultaneously in at least one pair of links supporting simultaneous transmitting and receiving functionality; and the transmit-receive module 420 may be configured to transmit the first message frame. In this case, the apparatus 400 may perform the method described with reference to FIG. 2, and repeated descriptions are omitted herein for brevity.

In the case where the apparatus 400 shown in FIG. 4 is applied to a receiver device, the transmit-receive module 420 may be configured to receive a first message frame, where the first message frame includes first identifier information configured to identify spatial streams used for a transmitting operation, and second identifier information configured to identify spatial streams used for a receiving operation, and the transmitting operation and the receiving operation are performed simultaneously in at least one pair of links supporting simultaneous transmitting and receiving functionality; and the processing module 410 may be configured to control the communication operation based on the first message frame. In this case, the apparatus 400 may perform the communication method described with reference to FIG. 3, and repeated descriptions are omitted herein for brevity.

Furthermore, the apparatus 400 shown in FIG. 4 is only exemplary, and the embodiments of the present disclosure are not limited thereto, e.g., the apparatus 400 may also include other modules, e.g., a memory module and the like. In addition, various modules in the apparatus 400 may be combined into more complex modules or may be divided into more separate modules.

The method for multi-link communication, and the apparatus for multi-link communication according to the embodiments of the present disclosure can enable the transmitting operation/receiving operation to use sufficient spatial streams, and not cause conflicts, so as to improve spectrum utilization.

Based on the same principles as the methods provided in the embodiments of the present disclosure, the embodiments of the present disclosure also provide an electronic device including a processor and storing instructions (which may also be referred to as computer programs) executable by the processor, where the processor is configured to, when executing the instructions, perform the method described with reference to FIGS. 2 and 3.

The embodiments of the present disclosure also provide a computer-readable storage medium, storing computer programs thereon, where the computer programs, when executed by a processor, cause the processor to perform the method described with reference to FIGS. 2 and 3.

In exemplary embodiments, the processor may be a logic box, module, and circuit for implementing or executing content described in conjunction with the present disclosure, such as a central processing unit (CPU), a general purpose processor, a digital signal processor (DSP), application specific integrated Circuit (ASIC), field programmable gate array (FPGA), or other programmable logic devices, transistor logic devices, hardware components, or any combination thereof. A processor may also be a combination that implements a computing function, such as a combination containing one or more microprocessors, a combination of a DSP and a microprocessor, and the like.

In exemplary embodiments, the memory may be, for example, a read only memory (ROM), a random access memory (RAM), an electrically erasable programmable read only memory (EEPROM), a compact disc read only memory (CD-ROM) or other optical disk storage, an optical disk storage (including a compact disc, a laserdisc, a CD-ROM, a digital versatile disc, a Blu-Ray disc, etc.), a disk storage media or other magnetic storage devices, or any other medium that can be used to carry or store program code in the form of instructions or data structures and can be accessed by a computer, but is not limited to thereto.

In some embodiments, there is provided a method for multi-link communication, including: determining a first message frame, where the first message frame includes first identifier information configured to identify spatial streams used for a transmitting operation, and second identifier information configured to identify spatial streams used for a receiving operation, and the transmitting operation and the receiving operation are performed simultaneously in at least one pair of links supporting simultaneous transmitting and receiving functionality; and transmitting the first message frame.

In some embodiments, the spatial streams used for the transmitting operation identified by the first identifier information do not overlap with the spatial streams used for the receiving operation identified by the second identifier information.

In some embodiments, the first identifier information and the second identifier information each include a bitmap corresponding to all supported spatial streams.

In some embodiments, the first identifier information and the second identifier information identify the spatial streams used for the transmitting operation and the spatial streams used for the receiving operation, respectively, by two parts of bits, where a first part in the two parts of bits identifies a starting spatial stream for the transmitting operation or a starting spatial stream for the receiving operation, and a second part in the two parts of bits identifies a number of the spatial streams used for the transmitting operation or a number of the spatial streams used for the receiving operation.

In some embodiments, the at least one pair of links includes at least two pairs of links, where the first message frame further includes a link identifier for each of the at least two pairs of links.

In some embodiments, the first message frame includes a plurality of pieces of the first identifier information and a plurality of pieces of the second identifier information, where the link identifier for each of the at least two pairs of links is mapped to a corresponding first identifier information and a corresponding second identifier information in mapping of the plurality of pieces of the first identifier information and the plurality of pieces of the second identifier information.

In some embodiments, a number of spatial streams identified by each of the plurality of pieces of the first identifier information and a number of spatial streams identified by each of the plurality of pieces of the second identifier information are both less than a maximum number of spatial streams.

In some embodiments, a sum of a number of spatial streams identified by the plurality of pieces of the first identifier information and a number of spatial streams identified by the plurality of pieces of the second identifier information is less than a maximum number of spatial streams.

In some embodiments, there is provided a method for multi-link communication, including: receiving a first message frame, where the first message frame includes first identifier information configured to identify spatial streams used for a transmitting operation, and second identifier information configured to identify spatial streams used for a receiving operation, and the transmitting operation and the receiving operation are performed simultaneously in at least one pair of links supporting simultaneous transmitting and receiving functionality; and performing a communication operation based on the first message frame.

In some embodiments, the spatial streams used for the transmitting operation identified by the first identifier information do not overlap with the spatial streams used for the receiving operation identified by the second identifier information.

In some embodiments, the first identifier information and the second identifier information each include a bitmap corresponding to all supported spatial streams.

In some embodiments, the first identifier information and the second identifier information identify the spatial streams used for the transmitting operation and the spatial streams used for the receiving operation, respectively, by two parts of bits, where a first part in the two parts of bits identifies a starting spatial stream for the transmitting operation or a starting spatial stream for the receiving operation, and a second part in the two parts of bits identifies a number of the spatial streams used for the transmitting operation or a number of the spatial streams used for the receiving operation.

In some embodiments, the at least one pair of links includes at least two pairs of links, where the first message frame further includes a link identifier for each of the at least two pairs of links.

In some embodiments, the first message frame includes a plurality of pieces of the first identifier information and a plurality of pieces of the second identifier information, where the link identifier for each of the at least two pairs of links is mapped to a corresponding first identifier information and a corresponding second identifier information in mapping of the plurality of pieces of the first identifier information and the plurality of pieces of the second identifier information.

In some embodiments, a number of spatial streams identified by each of the plurality of pieces of the first identifier information and a number of spatial streams identified by each of the plurality of pieces of the second identifier information are both less than a maximum number of spatial streams.

In some embodiments, a sum of a number of spatial streams identified by the plurality of pieces of the first identifier information and a number of spatial streams identified by the plurality of pieces of the second identifier information is less than a maximum number of spatial streams.

In some embodiments, there is provided an apparatus for multi-link communication, including: a processing module, configured to determine a first message frame, where the first message frame includes first identifier information configured to identify spatial streams used for a transmitting operation, and second identifier information configured to identify spatial streams used for a receiving operation, and the transmitting operation and the receiving operation are performed simultaneously in at least one pair of links supporting simultaneous transmitting and receiving functionality; and a transmit-receive module, configured to transmit the first message frame.

In some embodiments, there is provided an apparatus for multi-link communication, including: a transmit-receive module, configured to receive a first message frame, where the first message frame includes first identifier information configured to identify spatial streams used for a transmitting operation, and second identifier information configured to identify spatial streams used for a receiving operation, and the transmitting operation and the receiving operation are performed simultaneously in at least one pair of links supporting simultaneous transmitting and receiving functionality; and a processing module, configured to perform a communication operation based on the first message frame.

In some embodiments, there is provided an electronic device, including: a processor; and a memory storing computer programs executable by the processor, where the processor is configured to, when executing the computer programs, perform any one of the above methods.

In some embodiments, there is provided a non-transitory computer-readable storage medium, storing computer programs thereon, where the computer programs, when executed by a processor, cause the processor to perform any one of the above methods.

The technical solution provided by the embodiments of the present disclosure can achieve high frequency spectrum utilization.

It will be understood that although the steps in the flowchart of the accompanying drawings are shown sequentially as indicated by the arrows, the steps are not necessarily executed sequentially in the order indicated by the arrows. Unless expressly stated herein, there is no strict order limitation on the execution of these steps, which may be executed in some other order. In addition, at least some of the steps in the flowchart of the accompanying drawings may include a plurality of sub-steps or a plurality of phases, which are not necessarily executed to completion at the same moment but may be executed at different moments, and which may be executed in an order that is not necessarily sequential, but may be executed in turn or alternately with at least a portion of the other steps, or of the sub-steps or phases of the other steps.

While the present disclosure has been shown and described with reference to certain embodiments of the present disclosure, those skilled in the art will appreciate that various changes in form and detail may be made without departing from the scope of the present disclosure. Accordingly, the scope of the present disclosure should not be limited to the embodiments, but should be limited by the accompanying claims and their equivalents.

The invention claimed is:

1. A method for multi-link communication, performed by a transmitter, comprising:

determining a first message frame, wherein the first message frame comprises first identifier information configured to identify spatial streams used for a transmitting operation of one link in each pair of at least one pair of links, and second identifier information configured to identify spatial streams used for a receiving operation of the other link in each pair of the at least one pair of links, and the transmitting operation and the receiving operation are performed simultaneously in the at least one pair of links supporting simultaneous transmitting and receiving functionality; and transmitting the first message frame;

wherein the at least one pair of links comprises at least two pairs of links;

wherein the first message frame further comprises a link identifier for each of the at least two pairs of links;

wherein the first message frame comprises a plurality of pieces of the first identifier information respectively corresponding to the at least two pairs of links, each piece of the first identifier information configured to identify spatial streams used for the transmitting operation of a respective pair of links, and a plurality of pieces of the second identifier information respectively corresponding to the at least two pairs of links, each piece of the second identifier information configured to identify spatial streams used for the receiving operation of a respective pair of links;

wherein the link identifier for each pair of the at least two pairs of links is mapped to a corresponding first identifier information and a corresponding second identifier information in mapping of the plurality of pieces of the first identifier information and the plurality of pieces of the second identifier information, wherein the first identifier information and the second identifier information identify the spatial streams used for the transmitting operation and the spatial streams used for the receiving operation, respectively, by two parts of bits, wherein a first part in the two parts of bits identifies a starting spatial stream for the transmitting operation or a starting spatial stream for the receiving operation, and a second part in the two parts of bits identifies a number of the spatial streams used for the transmitting operation or a number of the spatial streams used for the receiving operation.

2. The method of claim 1, wherein the spatial streams used for the transmitting operation identified by the first identifier information does not overlap with the spatial streams used for the receiving operation identified by the second identifier information.

3. The method of claim 1, wherein the first identifier information and the second identifier information each comprise a bitmap corresponding to all supported spatial streams.

4. The method of claim 1, wherein a number of spatial streams identified by each of the plurality of pieces of the first identifier information and a number of spatial streams identified by each of the plurality of pieces of the second identifier information are both less than a maximum number of spatial streams.

5. The method of claim 1, wherein a sum of a number of spatial streams identified by the plurality of pieces of the first identifier information and a number of spatial streams identified by the plurality of pieces of the second identifier information is less than a maximum number of spatial streams.

6. A method for multi-link communication, performed by a receiver, comprising:

receiving a first message frame, wherein the first message frame comprises first identifier information configured to identify spatial streams used for a transmitting operation of one link in each pair of at least one pair of links, and second identifier information configured to identify spatial streams used for a receiving operation of the other link in each pair of the at least one pair of links, and the transmitting operation and receiving operation are performed simultaneously in the at least one pair of links supporting simultaneous transmitting and receiving functionality; and performing a communication operation based on the first message frame;

wherein the at least one pair of links comprises at least two pairs of links;

wherein the first message frame further comprises a link identifier for each of the at least two pairs of links;

wherein the first message frame comprises a plurality of pieces of the first identifier information respectively corresponding to the at least two pairs of links, each piece of the first identifier information configured to identify spatial streams used for the transmitting operation of a respective pair of links, and a plurality of pieces of the second identifier information respectively corresponding to the at least two pairs of links, each piece of the second identifier information configured to identify spatial streams used for the receiving operation of a respective pair of links;

wherein the link identifier for each pair of the at least two pairs of links is mapped to a corresponding first identifier information and a corresponding second identifier information in mapping of the plurality of pieces of the first identifier information and the plurality of pieces of the second identifier information, wherein the first identifier information and the second identifier information identify the spatial streams used for the transmitting operation and the spatial streams used for the receiving operation, respectively, by two parts of bits, wherein a first part in the two parts of bits identifies a starting spatial stream for the transmitting operation or a starting spatial stream for the receiving operation, and a second part in the two parts of bits identifies a number of the spatial streams used for the transmitting operation or a number of the spatial streams used for the receiving operation.

7. The method of claim 6, wherein the spatial streams used for the transmitting operation identified by the first identifier information does not overlap with the spatial streams used for the receiving operation identified by the second identifier information.

8. The method of claim 6, wherein the first identifier information and the second identifier information each comprise a bitmap corresponding to all supported spatial streams.

9. The method of claim 6, wherein the first identifier information and the second identifier information identify the spatial streams for the transmitting operation and the spatial streams used for the receiving operation, respectively, by two parts of bits, wherein a first part in the two parts of bits identifies a starting spatial stream for the transmitting operation or a starting spatial stream for the receiving operation, and a second part in the two parts of bits identifies a number of the spatial streams used for the transmitting operation or a number of the spatial streams used for the receiving operation.

10. The method of claim 6, wherein a number of spatial streams identified by each of the plurality of pieces of the first identifier information and a number of spatial streams identified by each of the plurality of pieces of the second identifier information are both less than a maximum number of spatial streams.

11. The method of claim 6, wherein a sum of a number of spatial streams identified by the plurality of pieces of the first identifier information and a number of spatial streams identified by the plurality of pieces of the second identifier information is less than a maximum number of spatial streams.

12. An electronic device, comprising:

a processor; and a memory storing computer programs executable by the processor, wherein the processor is configured to, when executing the computer programs, perform operations comprising:

determining a first message frame, wherein the first message frame comprises first identifier information configured to identify spatial streams used for a transmitting operation of one link in each pair of at least one pair of links, and second identifier information configured to identify spatial streams used for a receiving operation of the other link in each pair of the at least one pair of links, and the transmitting operation and the receiving operation are performed simultaneously in the at least one pair of links supporting simultaneous transmitting and receiving functionality; and transmitting the first message frame;

wherein the at least one pair of links comprises at least two pairs of links;

wherein the first message frame further comprises a link identifier for each of the at least two pairs of links;

wherein the first message frame comprises a plurality of pieces of the first identifier information respectively corresponding to the at least two pairs of links, each piece of the first identifier information configured to identify spatial streams used for the transmitting operation of a respective pair of links, and a plurality of pieces of the second identifier information respectively corresponding to the at least two pairs of links, each piece of the second identifier information configured to identify spatial streams used for the receiving operation of a respective pair of links;

wherein the link identifier for each pair of the at least two pairs of links is mapped to a corresponding first identifier information and a corresponding second identifier information in mapping of the plurality of pieces of the first identifier information and the plurality of pieces of the second identifier information, wherein the first identifier information and the second identifier information identify the spatial streams used for the transmitting operation and the spatial streams used for the receiving operation, respectively, by two parts of bits, wherein a first part in the two parts of bits identifies a starting spatial stream for the transmitting operation or a starting spatial stream for the receiving operation, and a second part in the two parts of bits identifies a number of the spatial streams used for the transmitting operation or a number of the spatial streams used for the receiving operation.

13. A non-transitory computer readable storage medium, storing computer programs thereon, wherein the computer programs, when executed by a processor, cause the processor to perform the method of claim 1.

14. An electronic device, comprising:

a processor; and a memory storing computer programs executable by the processor, wherein the processor is configured to, when executing the computer programs, perform the method of claim 6.

15. A non-transitory computer readable storage medium, storing computer programs thereon, wherein the computer programs, when executed by a processor, cause the processor to perform the method of claim 6.

\* \* \* \* \*